(12) United States Patent
Aoi

(10) Patent No.: US 12,555,701 B2
(45) Date of Patent: Feb. 17, 2026

(54) WIRE HARNESS WITH EXTERIOR SHEET AND WATER REPELLANT

(71) Applicants: AUTONETWORKS TECHNOLOGIES, LTD., Yokkaichi (JP); SUMITOMO WIRING SYSTEMS, LTD., Yokkaichi (JP); SUMITOMO ELECTRIC INDUSTRIES, LTD., Osaka (JP)

(72) Inventor: Kazuaki Aoi, Yokkaichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 237 days.

(21) Appl. No.: 18/561,485

(22) PCT Filed: May 23, 2022

(86) PCT No.: PCT/JP2022/021129
§ 371 (c)(1),
(2) Date: Nov. 16, 2023

(87) PCT Pub. No.: WO2022/255149
PCT Pub. Date: Dec. 8, 2022

(65) Prior Publication Data
US 2025/0087383 A1 Mar. 13, 2025

(30) Foreign Application Priority Data
Jun. 1, 2021 (JP) ................. 2021-092473

(51) Int. Cl.
*H01B 7/282* (2006.01)
*H01B 7/00* (2006.01)

(52) U.S. Cl.
CPC ........... *H01B 7/0045* (2013.01); *H01B 7/282* (2013.01)

(58) Field of Classification Search
CPC ...... H01B 7/0045; H01B 7/00; H01B 7/2825; B60R 16/02; H01R 4/70; H01R 13/6581; H02G 3/04
(Continued)

(56) References Cited

U.S. PATENT DOCUMENTS

| | | | |
|---|---|---|---|
| 3,789,099 A * | 1/1974 | Garrett | H01B 13/323 264/261 |
| 4,537,225 A * | 8/1985 | McNulty | F16L 9/16 138/145 |

(Continued)

FOREIGN PATENT DOCUMENTS

| | | |
|---|---|---|
| JP | 2015-139311 A | 7/2015 |
| JP | 2016-126982 A | 7/2016 |

(Continued)

OTHER PUBLICATIONS

Aug. 9, 2022 International Search Report issued in International Patent Application No. PCT/JP2022/021129.

*Primary Examiner* — Timothy J Thompson
*Assistant Examiner* — Michael F Mcallister
(74) *Attorney, Agent, or Firm* — Oliff PLC

(57) ABSTRACT

A wire harness including: at least one electric wire; a connector provided at an end of the at least one electric wire; and an exterior sheet that surrounds an outer periphery of the at least one electric wire, wherein the exterior sheet is wrapped around the outer periphery of the at least one electric wire and includes a water repellant, which has water repellency, on at least part of an outer surface of the exterior sheet.

10 Claims, 5 Drawing Sheets

(58) Field of Classification Search
USPC .......................................................... 174/72 A
See application file for complete search history.

(56) References Cited

U.S. PATENT DOCUMENTS

| | | | |
|---|---|---|---|
| 9,277,684 B2* | 3/2016 | Laurent | ................ D03D 1/0058 |
| 2002/0098311 A1* | 7/2002 | Lindner | ................ D04H 1/555 |
| | | | 428/920 |
| 2015/0274095 A1* | 10/2015 | Inao | .................... H02G 3/0468 |
| | | | 174/72 A |
| 2016/0372906 A1 | 12/2016 | Wakabayashi et al. | |
| 2022/0048447 A1* | 2/2022 | Shimizu | .................. H02G 1/14 |

FOREIGN PATENT DOCUMENTS

| | | |
|---|---|---|
| JP | 2017-010653 A | 1/2017 |
| JP | 2018-107020 A | 7/2018 |

* cited by examiner

WIRE HARNESS WITH EXTERIOR SHEET AND WATER REPELLANT

BACKGROUND

The present disclosure relates to a wire harness.

Conventionally, wire harnesses mounted in vehicles, such as automobiles, include electric wires and connectors provided at the ends of the electric wires. As described in JP 2016-126982A for example, some wire harnesses of this type further include a corrugated tube that covers the outer circumference of the electric wires and rubber boots that suppress infiltration of water into the wire harness from between the ends of the corrugated tube and the connectors. Each rubber boot makes tight contact with the outer peripheral surface of the corrugated tube, which suppresses infiltration of water into the wire harness from between the rubber boots and the outer peripheral surface of the corrugated tube. By also making tight contact with the outer peripheral surface of the connector, each rubber boot suppresses infiltration of water into the wire harness from between a connector and that rubber boot. The opening at each end of the corrugated tube is covered by the rubber boot and a connector.

SUMMARY

A corrugated tube that has a larger inner diameter than the outer diameter of the electric wires to be placed inside the corrugated tube is normally used. This means that a layer of air is present between the inner peripheral surface of the corrugated tube and the outer peripheral surfaces of the electric wires. Accordingly, when heat has been generated due to current being supplied to an electric wire, such heat will tend to linger inside the corrugated tube. In addition, when the openings at the ends of the corrugated tube are covered by rubber boots and the connectors as described above, heat is even more likely to linger inside the corrugated tube. There is also concern that the temperature inside the corrugated tube will rise even further when, for example, heat from electrical equipment to which a connector is connected propagates via the connector to the wire harness.

Accordingly, although a wire harness including the corrugated tube and rubber boots described above has improved waterproofing, there has been the problem of poor dissipation of heat. Although it would be conceivable to simply eliminate the rubber boots from the wire harness to improve the dissipation of heat, this would result in reduced waterproofing.

An exemplary aspect of the disclosure provides a wire harness that improves the dissipation of heat while suppressing any reduction in waterproofing.

A wire harness according to an aspect of the present disclosure is a wire harness that includes at least one electric wire; a connector provided at an end of the at least one electric wire; and an exterior sheet that surrounds an outer periphery of the at least one electric wire, wherein the exterior sheet is wrapped around the outer periphery of the at least one electric wire and includes a water repellant, which has water repellency, on at least part of an outer surface of the exterior sheet.

The wire harness according to the present disclosure can improve dissipation of heat while suppressing any deterioration in waterproofing.

DETAILED DESCRIPTION OF EMBODIMENTS

Figure 1:
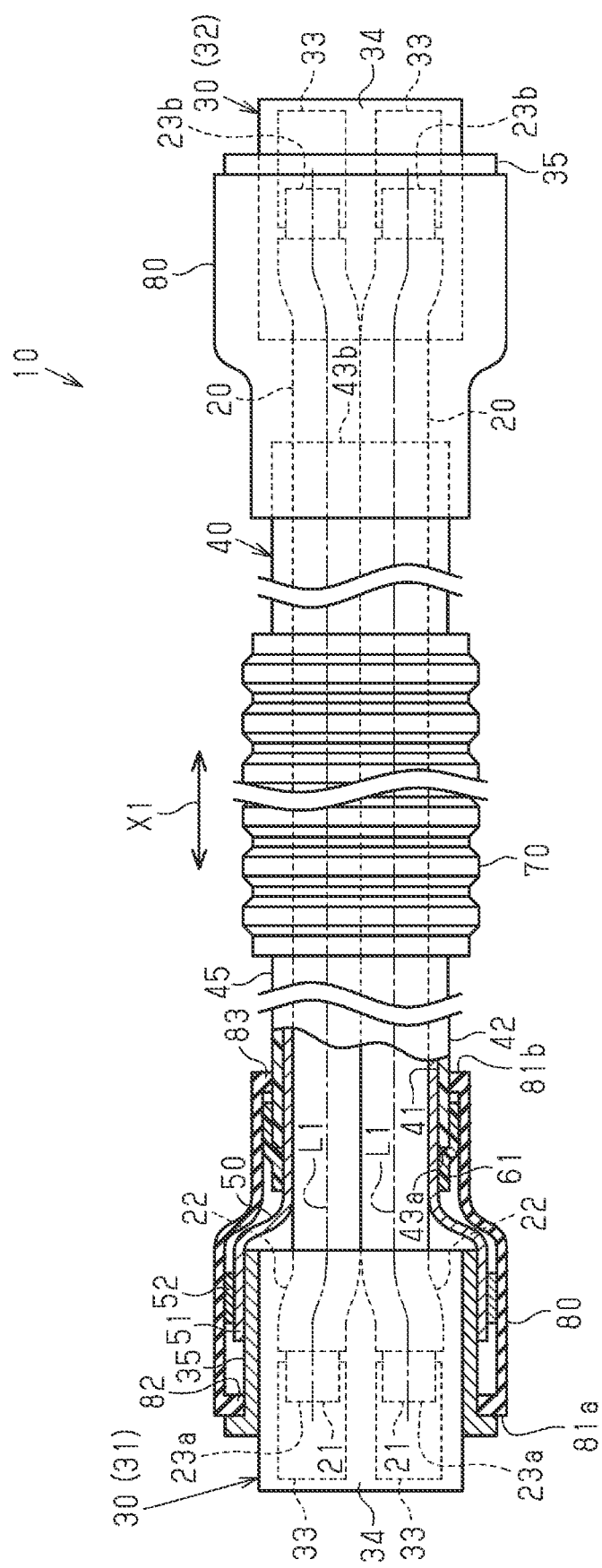
FIG. 1 is a schematic diagram of a wire harness according to a first embodiment.

Outline of Embodiments of the Present Disclosure

Embodiments of the present disclosure will first be listed and described in outline.

A wire harness according to the present disclosure is (1) a wire harness that includes at least one electric wire and a connector provided at an end of the at least one electric wire. The wire harness includes an exterior sheet that surrounds an outer periphery of the at least one electric wire, and the exterior sheet is wrapped around the outer periphery of the at least one electric wire and includes a water repelling portion, which has water repellency, on at least part of an outer surface of the exterior sheet.

According to the above configuration, the exterior sheet is wrapped around the outer circumference of the electric wire(s). This means that the space between the inner surface of the exterior sheet and the outer peripheral surface of the electric wire(s) can be made smaller compared to the space between the inner peripheral surface of an exterior member, such as a corrugated tube, and the outer peripheral surface of the electric wire(s). Accordingly, since the volume of air between the inner surface of the exterior sheet and the outer peripheral surface of the electric wire(s) can be reduced, it is possible to suppress the buildup of heat inside the exterior sheet. It is also possible to make the distance between the inner surface of the exterior sheet and the outer peripheral surface of the electric wire(s) smaller than the distance between the inner peripheral surface of an exterior member, such as a corrugated tube, and the outer peripheral surface of the electric wire(s). This means that when heat has been generated in an electric wire due to current being supplied to the electric wire, the heat of the electric wire can easily dissipate from the exterior sheet to outside the wire harness. As a result, dissipation of heat by the wire harness can be improved.

The water repelling portion on the outer surface of the exterior sheet repels water. This means that when the wire harness is exposed to water, any water that contacts the water repelling portion is likely to fall off. This suppresses the infiltration of water adhering to the water repelling portion into the inside of the wire harness. By doing so, any deterioration in the waterproofing of the wire harness is suppressed.

(2) It is preferable for the wire harness to further include an exterior member that covers part of the outer surface of the exterior sheet.

According to this configuration, the exterior member can protect the electric wire(s) and the part of the exterior sheet disposed inside the exterior member.

(3) It is preferable for the exterior sheet to include the water repelling portion across at least an entire range of the outer surface that is exposed to an outside of the exterior member.

According to this configuration, even if water splashes onto any location where the exterior sheet is exposed to the outside of the exterior member, infiltration of such water inside the wire harness can be suppressed. Accordingly, any deterioration in the waterproofing of the wire harness can be further suppressed.

(4) It is preferable for the exterior member to have a tubular shape that surrounds an outer circumference of the exterior sheet and to include a first waterproof member that covers an entire outer circumference of both an end of the exterior sheet in a length direction of the at least one electric wire and the connector.

With the above configuration, the first waterproof member can prevent water from infiltrating the inside of the exterior sheet from an end of the exterior sheet in the length direction of the electric wires. The same first waterproof member can also prevent water infiltration into the inside of the connector. Accordingly, deterioration in the waterproofing of the wire harness can be further suppressed.

(5) It is preferable for the exterior member to have a tubular shape that surrounds an outer circumference of the exterior sheet and to include a second waterproof member that covers a gap between an inner peripheral surface of an end region of the exterior member in a length direction of the at least one electric wire and the outer surface.

According to the above configuration, the second waterproof member can prevent water from infiltrating the inside of the exterior member from the end of the exterior member in the length direction of the electric wires. Accordingly, deterioration in the waterproofing of the wire harness can be further suppressed.

(6) It is preferable for the exterior member to have a tubular shape that surrounds an outer circumference of the exterior sheet and to have a drain portion that passes through the exterior member between an inside and an outside along a direction that intersects a length direction of the at least one electric wire.

According to the above configuration, when water has infiltrated the interior of the exterior member, it is possible to discharge such water from the drain portion to outside the exterior member. With the exterior member, it is possible to protect the electric wires and the part of the exterior sheet disposed inside the exterior member.

(7) It is preferable for the exterior sheet to include the water repelling portion over the entire outer surface.

According to this configuration, even if water splashes onto any location on the outer surface of the exterior sheet, infiltration of such water inside the wire harness can be suppressed. Accordingly, any deterioration in the waterproofing of the wire harness can be further suppressed. Also, compared to an exterior sheet that has the water repelling portion partially covering the outer surface, it is easier to manufacture an exterior sheet that has the water repelling portion over the entire outer surface.

(8) It is preferable for the exterior sheet to be woven fabric or nonwoven fabric.

By using this configuration, when the electric wires are bent during routing of the wire harness, the exterior sheet will easily bend in keeping with the shape of the electric wires. This means routing of the wire harness can be performed easily.

(9) It is preferable for the exterior sheet to be woven fabric that is interwoven with resin fibers. By using this configuration, the exterior sheet can be easily wrapped around the outer circumference of the electric wires.

(10) It is preferable for the exterior sheet to include a plurality of mesh holes, and for the water repelling portion to be a film that covers the mesh holes.

With the above configuration, even if the exterior sheet has mesh holes in a part of the outer surface of the exterior sheet where the water repelling portion is present, infiltration of water into the inside of the exterior sheet from the mesh holes can be suppressed by the water repelling portion.

(11) It is preferable for the exterior sheet to be an elastomer sheet.

According to this configuration, it is possible to obtain an exterior sheet including a water repelling portion without subjecting the outer surface of the exterior sheet to a process that adds water repellency, such as a water repelling process or a waterproofing process.

(12) It is preferable for the connector to include a connector housing that internally holds end regions of the at least one electric wire in the length direction of the at least one electric wire and a shield shell that covers at least part of an outer surface of the connector housing, for the wire harness to further include a braided member that covers an outer circumference of the at least one electric wire and contacts the shield shell, and for the exterior sheet to be wrapped around an outer circumference of the braided member.

According to the above configuration, it is possible for the exterior sheet to prevent water from adhering to the braided member.

DETAILED DESCRIPTION OF EMBODIMENTS OF THE PRESENT DISCLOSURE

A specific example of a wire harness according to the present disclosure is described below with reference to the drawings. For ease of description, parts of the configuration may be exaggerated or simplified in the drawings. The ratios of the dimensions of the respective parts in the drawings may differ from an actual device, and such ratios may differ between individual drawings. The expression "perpendicular" in the present specification includes not only configurations that are strictly perpendicular but also configurations that are roughly perpendicular within a range in which the actions and effects of the present embodiments are realized. The expression "tubular" in the present specification refers not only to shapes where a peripheral wall is formed continuously around the entire circumference in the circumferential direction, but also to shapes where a plurality of components are assembled to form a tube and shapes with a gap at one part in the circumferential direction, like a C shape. The expression "tubular" includes shapes with an outer circumference that is circular, oval, and polygonal with sharp or rounded corners, but is not limited to such. The expression "annular" as used in the present specification may refer to any structure that forms a loop or continuous shape with no ends, as well as structures in an overall loop shape. "Annular" shapes include, but are not limited to, circles, ovals, and polygons with pointed or rounded corners. The present disclosure is not limited to the examples described here and is indicated by the scope of the patent claims and intended to include all modifications within the meaning and range of the patent claims and their equivalents.

First Embodiment

A wire harness according to a first embodiment is described below.

Overall Configuration of Wire Harness 10

A wire harness 10 depicted in FIG. 1 is mounted in a vehicle, such as a hybrid vehicle or an electric vehicle. The wire harness 10 electrically connects two or more vehicle-mounted devices. As one example, the wire harness 10 electrically connects two vehicle-mounted devices. As examples, these vehicle-mounted devices include high-voltage batteries, inverters, motors, and electrical connection boxes. An "electrical connection box" houses equipment that performs at least one of supplying of power and transmission of signals to a vehicle-mounted device. Examples of electrical connection boxes include relay boxes, fuse boxes, and junction boxes. As one example, the wire harness 10 electrically connects an inverter and a motor.

The wire harness 10 includes at least one electric wire 20, a connector 30 provided at one or both ends of the electric wire(s) 20, and an exterior sheet 40 that covers an outer circumference of the electric wire(s) 20. The wire harness 10 may also include a braided member 50 that covers the outer circumference of the electric wires 20. As one example, the wire harness 10 includes two electric wires 20. The wire harness 10 in this example also includes two connectors 30.

Configuration of Electric Wires 20

Figure 2:
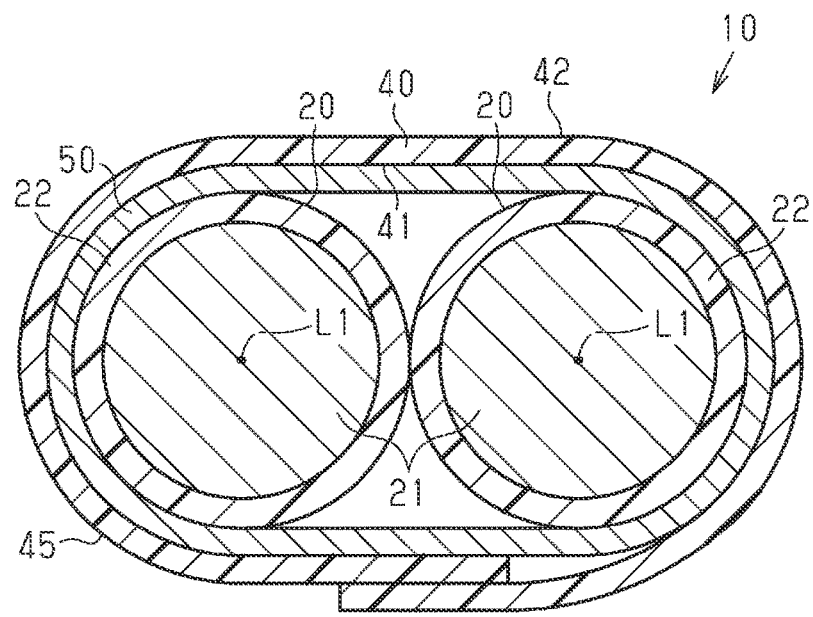
FIG. 2 is a horizontal cross-sectional view that schematically depicts the wire harness according to the first embodiment.

As depicted in FIGS. 1 and 2, each electric wire 20 includes a core wire 21 that is electrically conductive and an insulating covering 22 that surrounds an outer circumference of the core wire 21 and is electrically insulating.

As examples of the core wire 21, it is possible to use a stranded wire formed by twisting a plurality of metal wires, a cylindrical conductor formed of a single cylindrical metal rod that is internally solid, and a tubular conductor with a structure that is internally hollow. As another example, it is also possible to use a combination of at least two of a stranded wire, a cylindrical conductor, and a tubular conductor as the core wire 21. As examples, a metal material such as a copper-based material or an aluminum-based material can be used as the material of the core wire 21.

The insulating covering 22 covers the entire outer circumference of the core wire 21 in the circumferential direction around a center line L1 of that electric wire 20. The insulating covering 22 is made of an insulating resin material, for example.

Note that in the drawings, the center line L1 of each electric wire 20 is indicated by a chain line. The center line L1 is a line that passes through the center of a cross section in the transverse direction of the electric wire 20. The expression "length direction X1" of an electric wire 20 is the direction in which the electric wire 20 extends and is also the direction along the center line L1.

Here, for each electric wire 20, one end out of the two ends of the electric wire 20 in the length direction X1 is referred to as the "first end 23a" and the other end is referred to as the "second end 23b"

Configuration of Connectors 30

As depicted in FIG. 1, one connector 30 out of the two connectors 30 is provided at the first ends 23a of the electric wires 20. The other connector 30 out of the two connectors 30 is provided at the second ends 23b of the electric wires 20. Here, the connector 30 provided at the first ends 23a is referred to as the "first connector 31" and the connector 30 provided at the second ends 23b is referred to as the "second connector 32".

As one example, the first connector 31 and the second connector 32 have the same configuration. For this reason, only the configuration of the first connector 31 will be described, and description of the configuration of the second connector 32 is omitted.

Figure 3:
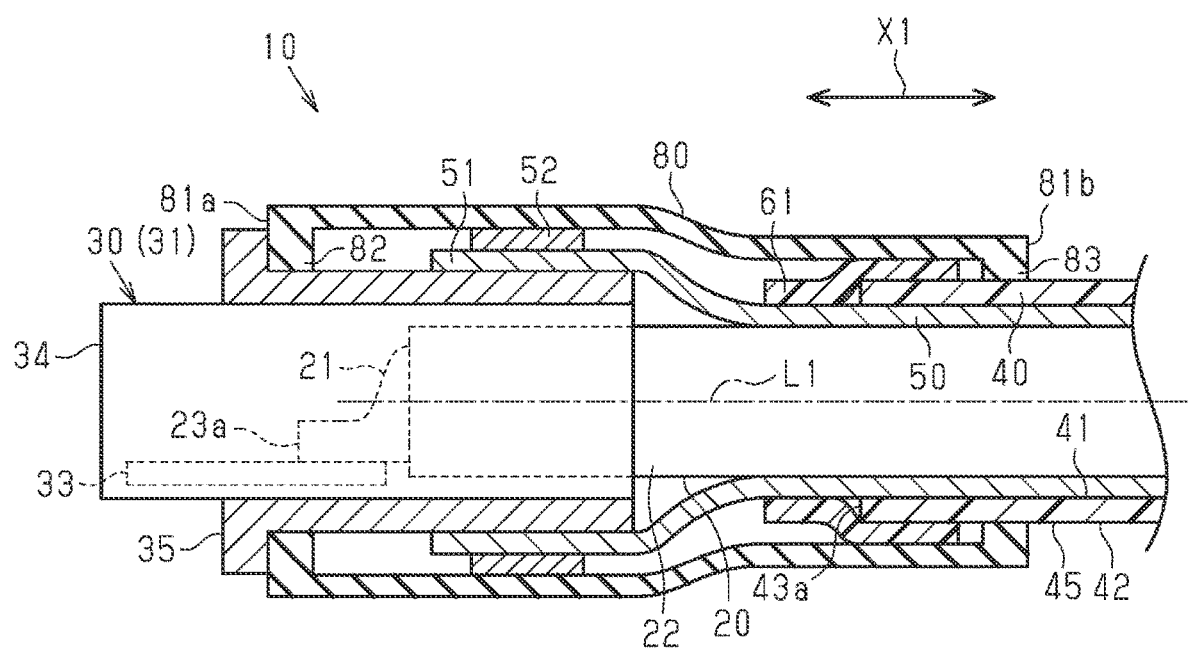
FIG. 3 is a vertical cross-sectional view of part of the wire harness according to the first embodiment.

As depicted in FIGS. 1 and 3, as one example, the first connector 31 includes terminals 33 that are electrically connected to the respective wires 20, a connector housing 34 that holds the terminals 33, and a shield shell 35 that covers at least part of an outer surface of the connector housing 34.

Configuration of Terminals 33

As examples of the material of each terminal 33, a metal material such as a copper-based material or an aluminum-based material can be used. Each terminal 33 is electrically connected to the first end 23a of an electric wire 20. In an end region that includes the first end 23a of each electric wire 20, the core wire 21 is exposed by stripping the insulating covering 22. The core wires 21 are electrically connected to the respective terminals 33 in the end regions that include the first ends 23a of each electric wire 20. Each core wire 21 is electrically connected to a terminal 33 by one of welding and crimping, for example. Note that each terminal 33 is electrically connected to a different mating terminal provided on a vehicle-mounted device. Vehicle-mounted devices and the electric wires 20 are electrically connected via the respective terminals 33.

Configuration of Connector Housing 34

The connector housing 34 is provided at the first end 23a of each electric wire 20. The connector housing 34 internally holds an end region of each wire 20 including the first end 23a. This means that the first ends 23a of the respective electric wires 20 are disposed inside the connector housing 34. The connector housing 34 also holds each terminal 33 inside the same connector housing 34. The connector housing 34 houses connected parts of the terminals 33 and the electric wires 20. Each electric wire 20 protrudes from the connector housing 34 to the outside of the connector housing 34 along the length direction X1, for example. The connector housing 34 is made of an insulating resin material, for example.

Configuration of Shield Shell 35

As one example, the shield shell 35 has an annular shape that surrounds the entire outer circumference of the connector housing 34 when looking from the length direction X1. As one example, the shield shell 35 may be tubular and extend in the length direction X1. An electrically conductive material is used as the material of the shield shell 35. As one example, an aluminum-based metal material is used as the material of the shield shell 35.

Configuration of Braided Member 50

As depicted in FIGS. 1 to 3, the braided member 50 is produced by weaving a plurality of metal strands into a tubular shape, for example. As one example, a metal material such as a copper-based material or an aluminum-based material can be used as the material of the braided member 50. As one example, copper is used as the material of the braided member 50. The braided member 50 collectively covers the outer peripheries of two electric wires 20 for example. As one example, the braided member 50 surrounds the entire outer circumference of the two electric wires 20 when looking from the length direction X1. As one example, the braided member 50 covers a part between the first connector 31 and the second connector 32 of each electric wire 20 along the entire length in the length direction X1. The braided member 50 may contact at least part of the outer peripheral surfaces of the electric wires 20.

The braided member 50 contacts the shield shell 35 of the first connector 31. That is, the braided member 50 has a contacting portion 51 that contacts the shield shell 35 of the first connector 31. As one example, the contacting portion 51 is an end region of the braided member 50 that includes one of the two ends of the braided member 50 in the length direction X1. As one example, the contacting portion 51 surrounds the entire circumference of the shield shell 35. As one example, an inner peripheral surface of the contacting portion 51 contacts an outer peripheral surface of the shield shell 35.

The wire harness 10 may include a tightening member 52 that fixes the contacting portion 51 to the shield shell 35 of the first connector 31. The tightening member 52 is wrapped around the outer circumference of the contacting portion 51. The tightening member 52 tightens the contacting portion 51 and the shield shell 35. The contacting portion 51 is sandwiched between the outer peripheral surface of the shield shell 35 and the tightening member 52 and contacts both the shield shell 35 and the tightening member 52. As one example, a stainless-steel band can be used as the tightening member 52.

Note that the braided member 50 also contacts the shield shell 35 of the second connector 32 in the same way. As one example, the shield shell 35 of the second connector 32 contacts an end region of the braided member 50 including the other end out of the two ends of the braided member 50 in the length direction X1.

Configuration of Exterior Sheet 40

As depicted in FIGS. 1 and 2, the exterior sheet 40 is composed of a sheet-like member. As examples, woven fabric or non-woven fabric can be used as the exterior sheet 40. As one example, woven fabric that has been interwoven with resin fibers can be used as the exterior sheet 40. One example of woven fabric in which resin fibers have been interwoven is a "twisted tube". A "twisted tube" is produced by rolling woven fabric, in which PE (polyester) fibers, such as PET (polyethylene terephthalate), aramid fibers, or the like have been interwoven, into a tube. Due to the interweaving of resin fibers, a twisted tube has a structure with mesh holes. As one example, the exterior sheet 40 is a twisted tube.

The exterior sheet 40 is wrapped around the outer circumference of the two electric wires 20. When looking from the length direction X1, the exterior sheet 40 covers the entire circumference of the two electric wires 20. The exterior sheet 40 is wrapped around the outer circumference of the electric wires 20 in a tubular shape that extends in the length direction X1. Note that by being wrapped around the outer circumference of the braided member 50, the exterior sheet 40 is also wrapped around the outer circumference of the electric wires 20 with the braided member 50 in between.

As depicted in FIGS. 1 and 3, as one example, the length of the exterior sheet 40 in the length direction X1 may be shorter than the length of the electric wires 20 in the length direction X1. As one example, the length of the exterior sheet 40 in the length direction X1 is shorter than the length of the braided member 50 in the length direction X1. Each electric wire 20 and the braided member 50 protrudes out of the exterior sheet 40 along the length direction X1 from both ends of the exterior sheet 40 in the length direction X1.

The wire harness 10 may include tape members 61 that fix end regions at both ends of the exterior sheet 40 in the length direction X1 to the braided member 50. The tape members 61 are adhesive tape, for example. The tape members 61 suppress displacement of the exterior sheet 40 with respect to the electric wires 20 and the braided member 50.

The wire harness 10 may also include a fixing member, not illustrated, which is wrapped around at least one location of the exterior sheet 40 in the length direction X1. As examples of this fixing member, adhesive tape, a binding band, or the like can be used. The fixing member prevents the exterior sheet 40 from deforming so that the outer diameter of the exterior sheet 40 increases so as to expose at least one of the electric wires 20 and the braided member 50. That is, the fixing member makes it easier to keep the exterior sheet 40 in a tubular shape.

The inner surface 41 of the exterior sheet 40 may contact the braided member 50. As one example, the entire inner surface 41 of the exterior sheet 40 may contact the braided member 50. Here, the inner surface 41 of the exterior sheet 40 is a surface that faces the inside of the exterior sheet 40 when the exterior sheet 40 has been placed in a tubular shape, and is the surface exposed to the inside of the exterior sheet 40. Conversely, an outer surface 42 of the exterior sheet 40 is a surface exposed to the outside of the exterior sheet 40 when the exterior sheet 40 is in the tubular shape.

Configuration of Exterior Member 70

As depicted in FIG. 1, the wire harness 10 may further include an exterior member 70 that partially covers the outer surface 42 of the exterior sheet 40. The wire harness 10 may be provided with only one exterior member 70 or may be provided with a plurality of exterior members 70 (exterior covers). However, the exterior sheet 40 has a part that is exposed to the outside without being covered by the exterior member 70. That is, the exterior sheet 40 has one part that is exposed to the outside of the wire harness 10.

As one example, the exterior member 70 covers a part of the exterior sheet 40 that may come into contact with components disposed in a surrounding area of the wire harness 10 when the wire harness 10 has been mounted on a vehicle. When, for example, the wire harness 10 is routed so as to pass below the floor of the vehicle, the exterior member 70 may cover a part of the exterior sheet 40 that may be struck by flying stones when the vehicle is in motion.

As one example, the exterior member 70 has a tubular shape that surrounds the outer circumference of the exterior sheet 40. As one example, the exterior member 70 is a tubular corrugated tube that surrounds the entire outer circumference of the exterior sheet 40 when looking from the length direction X1. Note that the exterior member 70 is not limited to a corrugated tube and may be a protector that partially covers the outer circumference of the exterior sheet 40 when looking from the length direction X1.

Configuration of First Waterproof Member 80

As depicted in FIGS. 1 and 3, the wire harness 10 may further include a first waterproof member 80 (first waterproof cover). Here, assume that one end out of the two ends of the exterior sheet 40 in the length direction X1 is a "first end 43a" and the other end is a "second end 43b". Note that the first end 43a is located near the first connector 31. The second end 43b is located near the second connector 32. The wire harness 10 includes two first waterproof members 80, for example. One first waterproof member 80 covers the entire outer circumference of both the first end 43a and the first connector 31. The other first waterproof member 80 covers the entire circumference of both the second end 43b and the second connector 32.

As one example, the two first waterproof members 80 have the same configuration. For this reason, only the first waterproof member 80 that covers the first end 43a and the first connector 31 will be described, and description of the other first waterproof member 80 is omitted.

As depicted in FIG. 3, the first waterproof member 80 collectively covers both the first end 43a and the first connector 31. The first waterproof member 80 has an annular shape that surrounds the entire outer circumference of the first connector 31 and the exterior sheet 40 when looking from the length direction X1. The first waterproof member 80 has a tubular shape that includes a first end 81a and a second end 81b and continuously extends from the first end 81a to the second end 81b along the length direction X1. The first end 81a surrounds the entire outer circumference of the first connector 31 when looking from the length direction X1. The second end 81b surrounds the entire outer circumference of the exterior sheet 40 when looking from the length direction X1.

As one example, the contacting portion 51, which contacts the shield shell 35 of the first connector 31, and the tightening member 52, which is wrapped around the contacting portion 51, are positioned between the first end 81a and the second end 81b in the length direction X1. As one example, the contacting portion 51 and the tightening member 52 wrapped around the contacting portion 51 are positioned inside the first waterproof member 80. In addition, out of the two ends of the braided member 50 in the length direction X1, the end that is closer to the first connector 31 and the first end 43a of the exterior sheet 40 are positioned between the first end 81a and the second end 81b in the length direction X1. As one example, out of the two ends of the braided member 50 in the length direction X1, the end closer to the first connector 31 and the first end 43a are positioned inside the first waterproof member 80. The first waterproof member 80 prevents water from splashing onto the part of the wire harness 10 that is located inside the first waterproof member 80.

The first waterproof member 80 may include a first tightly contacting portion 82 that makes tight contact with the outer peripheral surface of the first connector 31 around the entire circumference. As one example, the first waterproof member 80 has the first tightly contacting portion 82 in an end region including the first end 81a of the first waterproof member 80. The first tightly contacting portion 82 makes tight contact with the outer peripheral surface of the shield shell 35 of the first connector 31, for example. The first tightly contacting portion 82 prevents water from infiltrating the inside of the first waterproof member 80 from between the outer peripheral surface of the first connector 31 and the inner peripheral surface of the first waterproof member 80.

The first waterproof member 80 may also include a second tightly contacting portion 83 that makes tight contact with the outer surface 42 of the exterior sheet 40 around the entire circumference. As one example, the first waterproof member 80 includes the second tightly contacting portion 83 in an end region including the second end 81b of the first waterproof member 80. The second tightly contacting portion 83 prevents water from infiltrating the inside of the first waterproof member 80 from between the outer surface 42 of the exterior sheet 40 and the inner peripheral surface of the first waterproof member 80.

Note that a rubber boot can be used as one example of the first waterproof member 80. The first waterproof member 80 is not limited to a rubber boot, and any member made of a water-impermeable material, such as adhesive tape or heat-shrinkable tubing can be used. When adhesive tape is used as the first waterproof member 80, the adhesive tape is spirally wrapped from the outer peripheral surface of the first connector 31 to the end region of the exterior sheet 40 including the first end 43a to form the adhesive tape into a tubular shape.

Configuration of Second Waterproof Member 90

Figure 4:
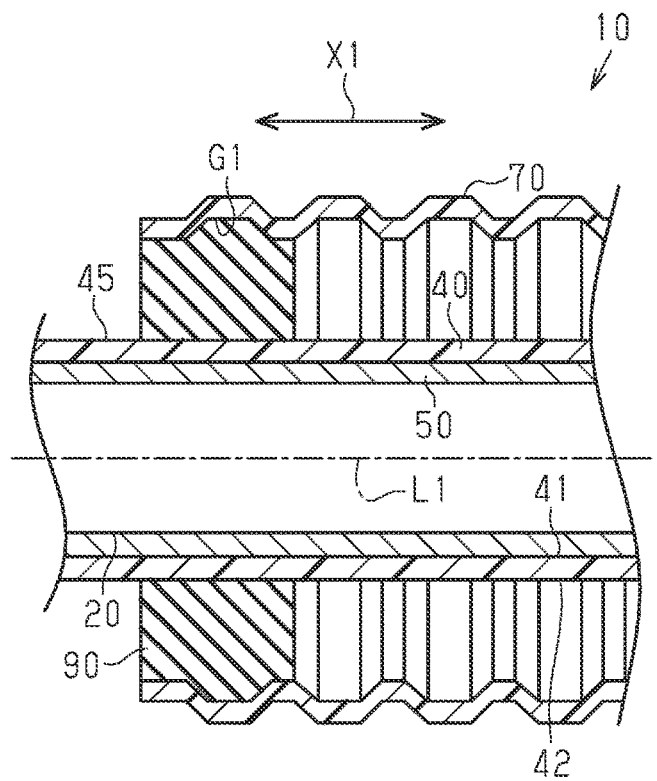
FIG. 4 is a vertical cross-sectional view schematically depicting part of the wire harness according to the first embodiment.

As depicted in FIG. 4, the wire harness 10 may further include a second waterproof member 90 (second waterproof cover). As one example, the wire harness 10 includes two second waterproof members 90. Note that only one of the two second waterproof members 90 is depicted in FIG. 4. The second waterproof members 90 are disposed at both ends of the exterior member 70 in the length direction X1. A gap G1 is present between the inner peripheral surface of each end region of the exterior member 70 in the length direction X1 and the outer surface 42 of the exterior sheet 40. The second waterproof members 90 seal these gaps G1. By sealing the gaps G1, the second waterproof members 90 prevent water from infiltrating the inside of the exterior member 70 from between the inner peripheral surface of the end regions of the exterior member 70 in the length direction X1 and the outer surface 42 of the exterior sheet 40.

As one example, rubber plugs can be used as the second waterproof members 90. When rubber plugs are used as the second waterproof members 90, the second waterproof members 90 have annular shapes and are placed in between the inner peripheral surfaces of end regions of the exterior member 70 in the length direction X1 and the outer surface 42 of the exterior sheet 40. The outer peripheral surface of each second waterproof member 90 makes tight contact with the inner peripheral surface of the end regions of the exterior member 70 in the length direction X1 around the entire circumference. In addition, the inner peripheral surface of each second waterproof member 90 makes tight contact with the outer surface 42 around the entire circumference. Note that the second waterproof members 90 are not limited to rubber plugs and may be any member made of a water-impermeable material, such as adhesive tape, a rubber boot, heat-shrinkable tubing, or the like.

Configuration of Water Repelling Portion 45

As depicted in FIGS. 1 and 2, the exterior sheet 40 has a water repelling portion 45 (water repellant), which repels water, on at least part of the outer surface 42 of the exterior sheet 40. The outer surface 42 repels water at the water repelling portion 45. The exterior sheet 40 may have the water repelling portion 45 over at least an entire range of the outer surface 42 that is exposed to the outside of the exterior member 70. As one example, the exterior sheet 40 has the water repelling portion 45 around the entire outer surface 42.

As one example, the water repelling portion 45 is a part of the outer surface 42 that is coated with a fluorine-based water-repelling agent or a silicon-based waterproofing agent that provides the outer surface 42 with a water-repelling function. A water repelling spray for example can be used to apply the water repelling agent to the outer surface 42. As another example, a waterproof spray can be used to apply a waterproofing agent to the outer surface 42. By using a water repelling spray or a waterproof spray, the water repelling portion 45 can be easily provided on the outer surface 42. The application of the water repelling agent or waterproofing agent onto the outer surface 42 may be performed on the exterior sheet 40 before the exterior sheet 40 is wrapped around the outer circumference of the electric wires 20 or may be performed on the exterior sheet 40 that has been wrapped around the outer circumference of the electric wires 20.

Actions of the First Embodiment

The actions of the present embodiment will now be described.

The exterior sheet 40 is wrapped around the outer circumference of the electric wires 20. This means that the space between the exterior sheet 40 and the outer peripheral surfaces of the electric wires 20 can be reduced. As one example, the exterior sheet 40 can be disposed in contact with the braided member 50 that is disposed on the outer circumference of the electric wires 20. This means that the thickness of the air layer between the exterior sheet 40 and the outer peripheral surfaces of the electric wires 20 can be reduced. In addition, when heat is generated due to current being supplied the electric wires 20 or the like, such heat can be easily transferred from the electric wires 20 to the exterior sheet 40.

When water contacts the water repelling portion 45 on the outer surface 42 of the exterior sheet 40, such water will be repelled by the water repelling function of the water repelling portion 45 and is likely to fall off. This suppresses the infiltration of water inside the exterior sheet 40.

The effects of the present embodiment will now be described.

(1-1) The wire harness 10 includes at least one electric wire 20 and the connectors 30 provided at the ends of the electric wires 20. The wire harness 10 also includes the exterior sheet 40 that surrounds the outer circumference of the electric wires 20. The exterior sheet 40 is wrapped around the outer circumference of the electric wires 20. The exterior sheet 40 includes the water repelling portion 45, which repels water, on at least part of the outer surface 42 of the exterior sheet 40.

According to this configuration, the exterior sheet 40 is wrapped around the outer circumference of the electric wire 20. This means that the space between the inner surface 41 of the exterior sheet 40 and the outer peripheral surfaces of the electric wires 20 can be made smaller compared to the space between the inner peripheral surface of an exterior member, such as a corrugated tube, and the outer peripheral surfaces of the electric wires. Accordingly, since the volume of air between the inner surface 41 of the exterior sheet 40 and the outer peripheral surfaces of the electric wires 20 can be reduced, it is possible to suppress the buildup of heat inside the exterior sheet 40. It is also possible to make the distance between the inner surface 41 of the exterior sheet 40 and the outer peripheral surfaces of the wires 20 shorter than the distances between the inner peripheral surface of an exterior member, such as a corrugated tube, and the outer peripheral surfaces of the electric wires. This means that when heat has been generated in the electric wires 20 due to current being supplied to the electric wires 20, the heat of the electric wires 20 can easily dissipate from the exterior sheet 40 to outside the wire harness 10. As a result, dissipation of heat by the wire harness 10 can be improved.

The water repelling portion 45 on the outer surface 42 of the exterior sheet 40 repels water. This means that when the wire harness 10 is exposed to water, any water that contacts the water repelling portion 45 is likely to fall off. This suppresses the infiltration of water adhering to the water repelling portion 45 into the inside of the wire harness 10. By doing so, any deterioration in the waterproofing of the wire harness 10 is suppressed.

(1-2) The wire harness 10 includes the exterior member 70 that partially covers the outer surface 42 of the exterior sheet 40.

According to this configuration, the exterior member 70 can protect the electric wires 20 and parts of the exterior sheet 40 disposed inside the exterior member 70.

(1-3) The exterior sheet 40 includes the water repelling portion 45 across at least the entire range of the outer surface 42 that is exposed to the outside of the exterior member 70.

According to this configuration, even if water splashes onto any location where the exterior sheet 40 is exposed to the outside of the exterior member 70, infiltration of such water inside the wire harness 10 can be suppressed. Accordingly, any deterioration in the waterproofing of the wire harness 10 can be further suppressed.

(1-4) The exterior member 70 has a tubular shape that surrounds the outer circumference of the exterior sheet 40. The wire harness 10 includes a first waterproof member 80 that covers the entire outer circumference of both the first end 43a of the exterior sheet 40 and the first connector 31. The wire harness 10 further includes a first waterproof member 80 that covers the entire outer circumference of both the second end 43b of the exterior sheet 40 and the second connector 32.

With this configuration, the first waterproof members 80 can prevent water from infiltrating the inside of the exterior sheet 40 from the first end 43a or the second end 43b. The first waterproof members 80 can also prevent water infiltration into the first connector 31 and the second connector 32. Accordingly, deterioration in the waterproofing of the wire harness 10 can be further suppressed.

The first waterproof members 80 according to the present embodiment further internally house a part of the braided member 50 that is exposed from the first end 43a to the outside of the exterior sheet 40. This means that it is possible to prevent water from adhering to a part of the braided member 50 that is exposed from the first end 43a to the outside of the exterior sheet 40. The first waterproof members 80 according to the present embodiment also internally house the contacting portion 51 and the tightening member 52. This means that it is possible to prevent water from adhering to the contacting portion 51 and the tightening member 52. Accordingly, even when the contacting portion 51 and the shield shell 35 are made of different types of metal, the occurrence of galvanic corrosion can be suppressed. In the same way, even when the contacting portion 51 and the tightening member 52 are made of different types of metal, the occurrence of galvanic corrosion can be suppressed.

(1-5) The exterior member 70 is shaped as a tube that surrounds the outer circumference of the exterior sheet 40. The wire harness 10 includes the second waterproof member 90 that seals the gap G1 between the inner peripheral surface of the end region of the exterior member 70 in the length direction X1 and the outer surface 42.

According to this configuration, the second waterproof member 90 can prevent water from infiltrating the inside of the exterior member 70 from the end of the exterior member 70 in the length direction X1. Accordingly, deterioration in the waterproofing of the wire harness 10 can be further suppressed.

(1-6) The exterior sheet 40 includes the water repelling portion 45 across the entire outer surface 42.

According to this configuration, even if water has splashed onto any part of the outer surface 42 of the exterior sheet 40, it is possible to suppress infiltration of such water into the inside of the wire harness 10. Accordingly, deterioration in the waterproofing of the wire harness 10 can be further suppressed. Compared to an exterior sheet that has the water repelling portion 45 partially covering the outer surface 42, it is easier to manufacture an exterior sheet 40 that has the water repelling portion 45 over the entire outer surface 42.

(1-7) The exterior sheet 40 is woven fabric or non-woven fabric. By using this configuration, when the electric wires 20 are bent during routing of the wire harness 10, the exterior sheet 40 will easily bend in keeping with the shape of the electric wires 20. This means routing of the wire harness 10 can be performed easily.

(1-8) The exterior sheet 40 is a woven fabric that is interwoven with resin fibers. By using this configuration, the exterior sheet 40 can be easily wrapped around the outer circumference of the electric wires 20.

(1-9) Each connector 30 includes a connector housing 34 that internally holds end regions in the length direction X1 of the wires 20, and a shield shell 35 that covers at least a part of the outer surface of the connector housing 34. The wire harness 10 includes a braided member 50 (braid) that covers the outer circumference of the electric wires 20 and contacts the shield shell 35. The exterior sheet 40 is wrapped around the outer circumference of the braided member 50.

According to this configuration, the exterior sheet 40 can prevent water from adhering to the braided member 50. This means that it is possible to prevent water from passing along the braided member 50 and reaching the contacting portion 51. As a result, even if the braided member 50 and the shield shell 35 are made of different types of metal, the occurrence of galvanic corrosion at contacting parts of the braided member 50 and the shield shell 35 can be suppressed. In the same way, even if the braided member 50 and the tightening member 52 are made of different types of metal, the occurrence of galvanic corrosion can be suppressed. Since it is possible to prevent the metal wires forming the braided member 50 from snapping due to corrosion, deterioration in the electromagnetic shielding ability of the braided member 50 can be suppressed.

Second Embodiment

A wire harness according to a second embodiment is described below. Note that in the second embodiment, configurations that are the same as in the first embodiment or correspond to the configurations in the first embodiment described above have been assigned the same reference numerals, and description thereof is omitted.

Overall Configuration of Wire Harness 10A

Figure 6:
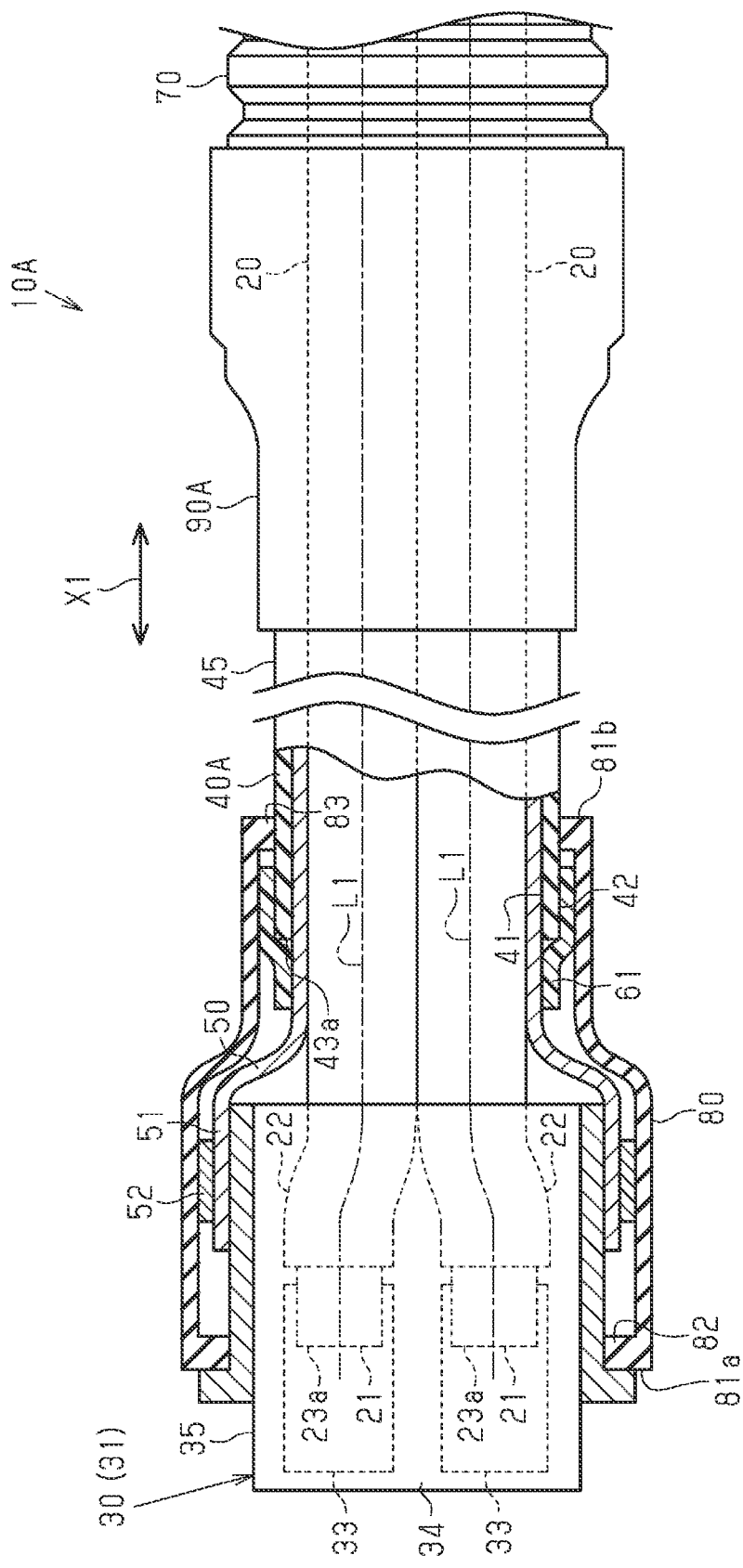
FIG. 6 is a schematic diagram depicting the wire harness according to the second embodiment.

As depicted in FIG. 6, the wire harness 10A according to the second embodiment includes an exterior sheet 40A provided in place of the exterior sheet 40 in the wire harness 10 of the first embodiment described above.

Configuration of Exterior Sheet 40A

The exterior sheet 40A is an elastomer sheet. A material with a property of repelling water is used as the elastomer. This means that the entire outer surface 42 of the exterior sheet 40A has water repellency. In other words, the exterior sheet 40A includes the water repelling portion 45 over the entire outer surface 42.

The exterior sheet 40A is wrapped around the wires 20 from above the braided member 50 for example. When looking from the length direction X1, the exterior sheet 40A covers the outer circumference of the two electric wires 20 around the entire circumference. The exterior sheet 40A is wrapped around the outer circumference of the electric wires 20 in a tubular shape that extends along the length direction X1. As one example, the length of the exterior sheet 40A in the length direction X1 is equal to the length in the length direction X1 of the exterior sheet 40 in the first embodiment described above. The exterior sheet 40 is fixed to the braided member 50 by a tape member 61, for example. The inner surface 41 of the exterior sheet 40A may contact the braided member 50. As one example, the entire inner surface 41 of the exterior sheet 40A may contact the braided member 50.

Configuration of Second Waterproof Member 90A

Figure 5:
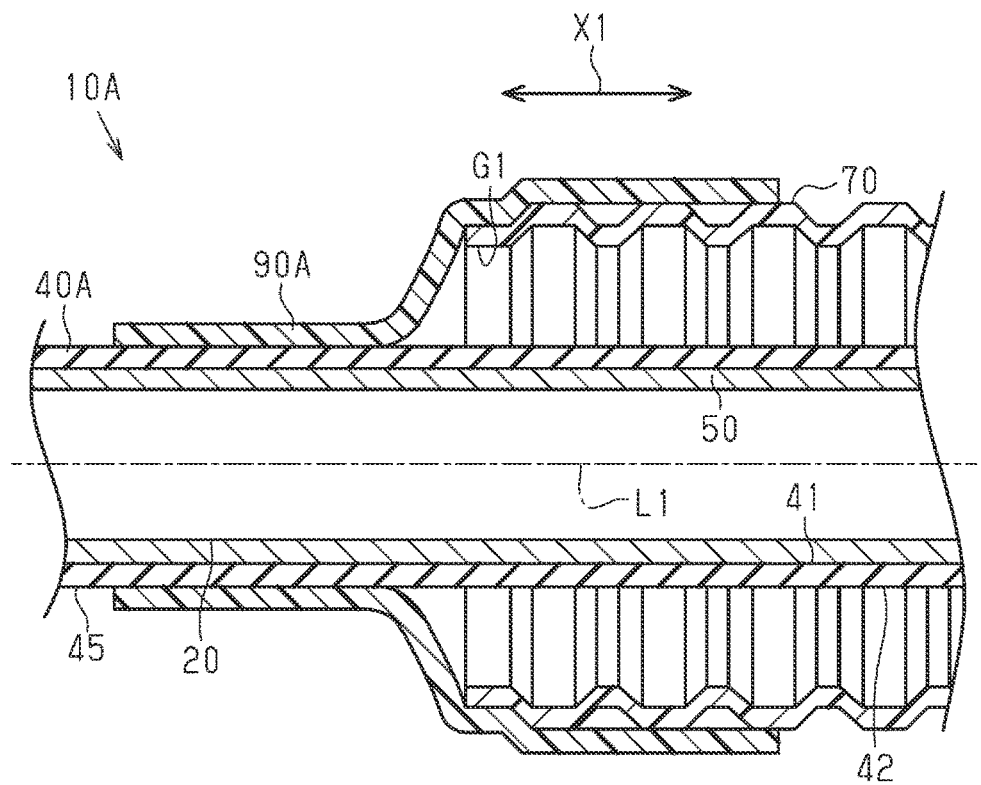
FIG. 5 is a vertical cross-sectional view schematically depicting part of a wire harness according to a second embodiment.

As depicted in FIG. 5, the wire harness 10A may include a second waterproof member 90A in place of the second waterproof member 90 of the first embodiment described above. As the second waterproof member 90A, the wire harness 10A includes two second waterproof members 90A for example. Note that FIG. 5 depicts only one out of the two second waterproof members 90A. The second waterproof members 90A are disposed at the two ends of the exterior member 70 in the length direction X1.

Adhesive tape may be used as the second waterproof members 90A. The second waterproof members 90A are wrapped in a continuous spiral on the outer peripheral surfaces of end regions in the length direction X1 of the exterior member 70 and portions of the outer surface 42 of the exterior sheet 40A that are adjacent to these end regions in the length direction X1. The second waterproof members 90A have a tubular shape that extends in the length direction X1. The second waterproof members 90A make tight contact with the outer peripheral surfaces of the end regions in the length direction X1 of the exterior member 70 around the entire circumference. In addition, the second waterproof members 90A make tight contact with the entire circumference of the outer surface 42. In this way, the second waterproof member 90A seals the gap G1 between the inner peripheral surface in the length direction X1 of the end region of the exterior member 70 and the outer surface 42 of the exterior sheet 40A. By sealing this gap G1, the second waterproof member 90A suppresses infiltration of water into the inside of the exterior member 70 from between the inner peripheral surface of the end region in the length direction X1 of the exterior member 70 and the outer surface 42 of the exterior sheet 40A.

According to the second embodiment, the same actions as the actions of the first embodiment described above are achieved.

According to the second embodiment, in addition to the effects (1-1) to (1-6) and (1-9) of the first embodiment described above, the following effects are obtained.

(2-1) The exterior sheet 40A is an elastomer sheet. According to this configuration, it is possible to obtain the exterior sheet 40A including the water repelling portion 45 without subjecting the outer surface 42 of the exterior sheet 40A to a process that adds water repellency, such as a water repelling process or waterproofing process.

The respective embodiments described above can be implemented with the following modifications. The embodiments described above and the following modifications can be implemented in combination with each other within a range that is technically consistent.

Aside from a member produced by weaving a plurality of metal wires into a tubular shape, the braided member 50 may be formed by weaving a plurality of metal wires into a sheet. In this case, the braided member 50 is wrapped around the outer circumference of the electric wires 20. The wire harnesses 10 and 10A may be provided with metal foil in place of the braided member 50. With this configuration also, the same effect as (1-9) of the first embodiment can be obtained.

In the first embodiment described above, the wire harness 10 does not need to include the braided member 50. In this case, the inner surface 41 of the exterior sheet 40 may contact the outer peripheral surfaces of the electric wires 20. In other words, the exterior sheet 40 may contact the outer peripheral surfaces of components that are disposed inside the exterior sheet 40 and are adjacent in a direction perpendicular to the length direction X1. The same may also apply to the wire harness 10A according to the second embodiment.

The connector 30 does not need to include the shield shell 35.

At least one of the outer surface 42 and the inner surface 41 of the exterior sheet 40A according to the second embodiment described above may have a plurality of undulations. With this configuration, the exterior sheet 40A can easily follow the shape of the electric wires 20 when the electric wires 20 become bent during routing of the wire harness 10A. This means that routing of the wire harness 10A can be performed easily.

Figure 7:
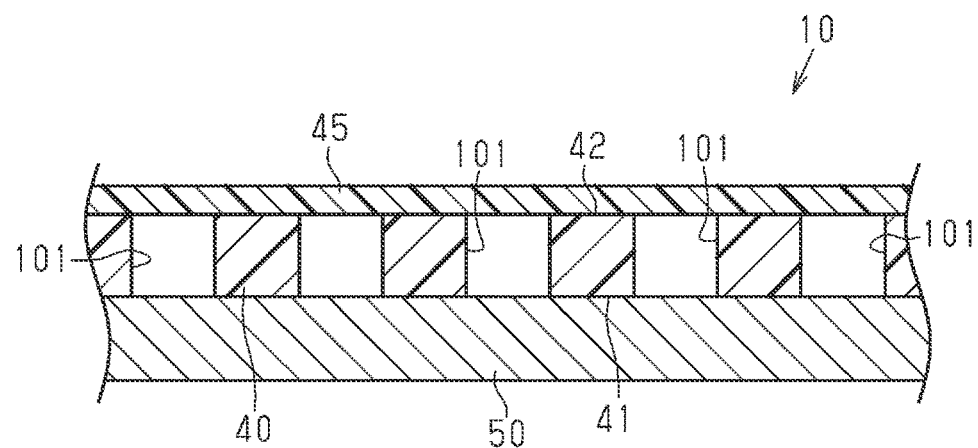
FIG. 7 is a cross-sectional view schematically depicting part of a wire harness according to a modification.

As depicted in FIG. 7, when woven fabric or nonwoven fabric is used as the exterior sheet 40, the exterior sheet 40 has a plurality of mesh holes 101. Even when a sheet-like material aside from woven fabric and nonwoven fabric is used for the exterior sheet 40, the exterior sheet 40 may have a plurality of mesh holes 101. For this reason, with the wire harness 10 according to the first embodiment described above, the water repelling portion 45 may be a film that covers the mesh holes 101. By doing so, even if the exterior sheet 40 has the mesh holes 101 in a part of the outer surface 42 of the exterior sheet 40 where the water repelling portion 45 is present, infiltration of water into the inside of the exterior sheet 40 from the mesh holes 101 can be suppressed by the water repelling portion 45. As a result, the waterproofing of the wire harness 10 can be improved.

Figure 8:
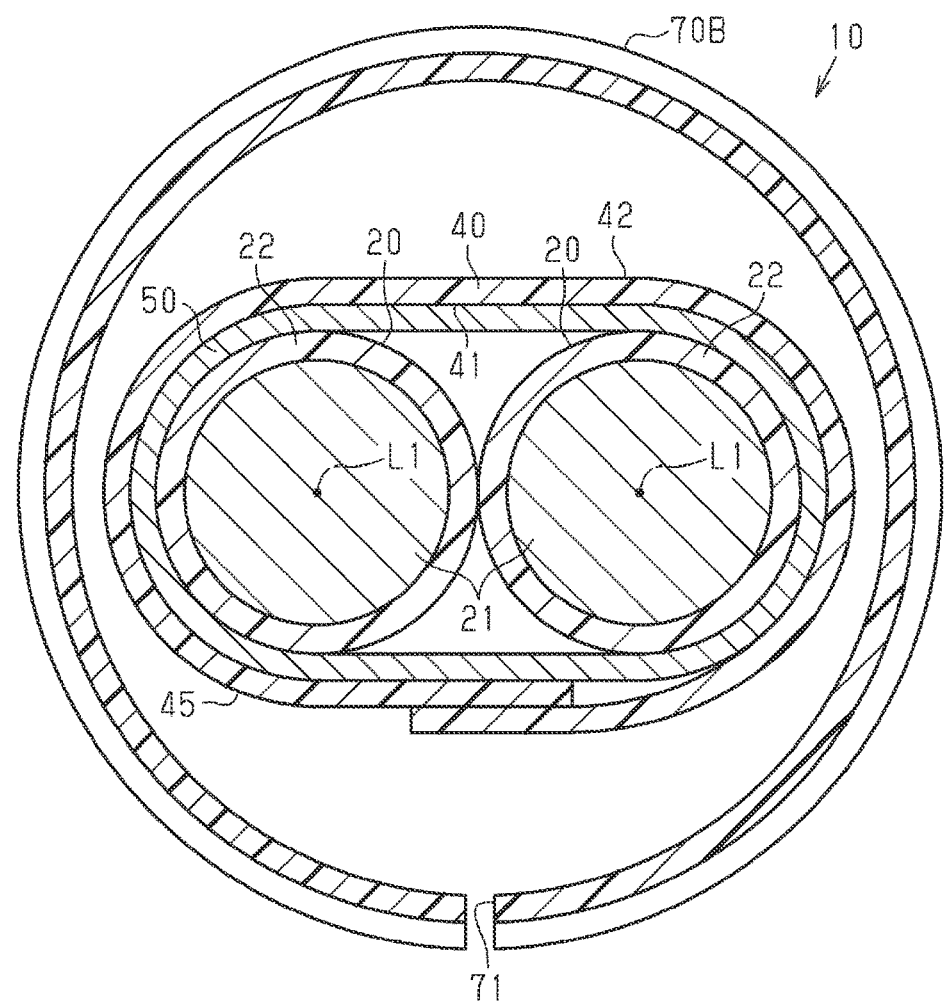
FIG. 8 is a horizontal cross-sectional view schematically depicting a wire harness according to a modification.

An exterior member 70B depicted in FIG. 8 may be provided in the wire harness 10 according to the first embodiment described above. The exterior member 70B is provided in the wire harness 10 in place of the exterior member 70 of the first embodiment described above. The exterior member 70B partially covers the outer surface 42 of the exterior sheet 40. The exterior member 70B has a tubular shape that surrounds the outer periphery of the exterior sheet 40. As one example, the exterior member 70B is a corrugated tube that surrounds the outer circumference of the exterior sheet 40. The exterior member 70B has a drain portion 71 (drain) that passes through the exterior member 70B between the inside and outside along a direction that intersects the length direction X1. As one example, the drain portion 71 passes through the exterior member 70B between the inside and outside along a direction that is perpendicular to the length direction X1. As one example, the drain portion 71 is formed as a slit that extends in the length direction X1. In FIG. 8, the length direction X1 corresponds to a direction that is perpendicular to the plane of the drawing. Note that the shape of the drain portion 71 is not limited to a slit, and may be any shape such as a hole, so long as water can be discharged from the inside of the exterior member 70B to the outside. With this configuration, when water has infiltrated the interior of the exterior member 70B, it is possible to discharge such water from the drain portion 71 to outside the exterior member 70B. Note that with this configuration, the exterior sheet 40 preferably has a water repelling portion 45 over at least the entire outer surface 42 of the part of the exterior sheet 40 that is disposed inside the exterior member 70B.

In the same way, in the wire harness 10A according to the second embodiment, the exterior member 70 may be changed to the exterior member 70B. In this case, the wire harness 10A does not need to include the second waterproof member 90.

In the first embodiment, the exterior sheet 40 includes the water repelling portion 45 over the entire outer surface 42. However, it is sufficient for the exterior sheet 40 to have the water repelling portion 45 on at least part of the outer surface 42. As one example, the exterior sheet 40 may include the water repelling portion 45 on only part of the outer surface 42 that may be exposed to water when the wire harness 10 is mounted in a vehicle. As one example, the exterior sheet 40 may include the water repelling portion 45 on a part of the outer surface 42 including a range that is exposed to the outside of the exterior member 70.

In the first embodiment described above, the wire harness 10 may include the second waterproof member 90A of the second embodiment in place of the second waterproof member 90. In the second embodiment described above, the wire harness 10A may include the second waterproof member 90 of the first embodiment in place of the second waterproof member 90A.

In the first embodiment described above, the wire harness 10 does not need to include one out of the two second waterproof members 90. The wire harness 10 also does not need to include any second waterproof members 90. Note that in this case, the exterior sheet 40 preferably has the water repelling portion 45 across the entire outer surface 42 of at least a part of the exterior sheet 40 that is disposed inside the exterior member 70.

In the same way, in the second embodiment described above, the wire harness 10A does not need to include one second waterproof member 90A out of the two second waterproof members 90A. The wire harness 10A also does not need to include any second waterproof member 90A.

In the first embodiment described above, the shapes of the first waterproof members 80 may be changed. One first waterproof member 80 may have a shape that collectively covers the entire circumferences of both the first end 43a and the first connector 31. One first waterproof member 80 may have a shape that collectively covers the entire outer circumferences of both the second end 43b and the second connector 32. As one example, a first waterproof member 80 does not need to include the second tightly contacting portion 83. In this case, it is preferable for the wire harness 10 to be mounted on the vehicle with the second end 81b positioned below the first end 81a. The second embodiment described above may also be modified in the same way.

In the first embodiment described above, the wire harness 10 does not need to be provided with the first waterproof members 80. The same also applies to the wire harness 10A according to the second embodiment described above.

In the first embodiment described above, the wire harness 10 does not need to be provided with the exterior member 70. The same also applies to the wire harness 10A according to the second embodiment described above.

In the first embodiment described above, the first connector 31 and the second connector 32 may have different configurations. The wire harness 10 may include only one out of the first connector 31 and the second connector 32. The second embodiment described above may be modified in the same way.

The number of wires 20 included in the wire harness 10 according to the first embodiment described above is not limited to two and may be one, or three or more. The number of connectors 30 included in the wire harness 10 may be appropriately changed in keeping with the number of electric wires 20 and/or the specification of the wire harness 10.

As depicted in FIG. 1, the exterior member 70 may be formed in a tubular shape that continuously extends along the length direction X1 from a first end, which is one end of the exterior member 70, to the second end, which is the other end. As depicted in FIG. 8, the drain portion 71 may pass through the exterior member 70B along a direction that is perpendicular to the length direction X1 and may communicate with the inside and the outside of the exterior member 70B.

As depicted in FIG. 1, the exterior sheet 40 may be wrapped around the outer circumference of the electric wires 20 and may include a part that is exposed to the outside without being surrounded by other members. As depicted in FIG. 2, the edges at both ends in the circumferential direction of the exterior sheet 40 may overlap each other.

As depicted in FIG. 3, the shield shell 35 may have a tubular portion and a flange portion that extends radially outward from the outer peripheral surface of the tubular portion. The flange portion may be an annular shape that extends around the entire circumference of the shield shell 35 in the circumferential direction. The flange portion may be provided in an end region in the length direction X1 of the tubular portion. The first contacting portion 82 of the first sealing member 80 may make tight contact with the outer peripheral surface of the tubular portion of the shield shell 35 in a direction that intersects the length direction X1 of the electric wires 20 and may also make tight contact in the length direction X1 of the electric wires 20 with a stepped surface between the tubular portion and the flange portion. The second contacting portion 83 of the first seal member 80 may make tight contact with the outer surface 42 of the exterior sheet 40 in a direction that intersects the length direction X1 of the electric wires 20. Note that the "length direction X1 of the electric wires 20" may be referred to as "the axial direction of the first waterproof member 80", and the "direction that intersects the length direction X1 of the electric wires 20" may be referred to as "the radial direction of the first waterproof member 80".

As depicted in FIG. 3, the first waterproof member 80 may cover the entire outer circumference of the braided member 50 so that the inner peripheral surface of the first waterproof member 80 does not come into contact with the braided member 50. The inner peripheral surface of the first waterproof member 80 may contact the outer peripheral surface of the tightening member 52. The inner peripheral surface of the first waterproof member 80 may contact the outer peripheral surface of the tape member 61.

The present disclosure also includes the following example implementations. Some components in these implementations have been assigned reference numerals to aid in understanding and not as a limitation. Some features and parts described in the implementations given below may be omitted, with it also being possible to select or extract and combine a number of features and parts indicated in these implementations.

Appendix 1

In one aspect of the present disclosure, the first waterproof member (80) described above may include the first tightly contacting portion (82) that makes tight contact with the outer peripheral surface of the connector (30) in a direction that intersects the length direction (X1) of the electric wires.

Appendix 2

In one aspect of the present disclosure, the shield shell (35) has a tubular portion and a flange portion that extends radially outward with respect to the tubular portion from an outer peripheral surface of the tubular portion. The first tightly contacting portion (82) makes tight contact with the outer peripheral surface of the tubular portion in the intersecting direction, and may make tight contact with a stepped surface between the tubular portion and the flange portion in the length direction (X1) of the electric wires.

Appendix 3

In one aspect of the present disclosure, the first waterproof member (80) may include a second tightly contacting portion (83) that makes tight contact with the outer surface (42) of the exterior sheet (40) in a direction that intersects the length direction (X1) of the electric wires.

All features of the embodiments disclosed here are exemplary and should not be regarded as limitations on the present disclosure. The scope of the present disclosure is indicated by the range of the patent claims, not the embodiments described above, and is intended to include all changes within the meaning and scope of the patent claims and their equivalents.

The invention claimed is:

1. A wire harness comprising:
    at least one electric wire;
    a connector provided at an end of the at least one electric wire; and
    an exterior sheet that surrounds an outer periphery of the at least one electric wire,
    an exterior cover that covers part of an outer surface of the exterior sheet, and
    an exposed portion of the exterior sheet not covered by the exterior cover,
    wherein the exterior sheet is wrapped around the outer periphery of the at least one electric wire and includes a water repellant, which has water repellency, on at least part of the outer surface of the exterior sheet, and
    wherein the exterior sheet includes the water repellant across at least an entire range of the outer surface of the exposed portion.

2. The wire harness according to claim 1,
    wherein the exterior cover has a tubular shape that surrounds an outer circumference of the exterior sheet and includes a first waterproof cover that covers an entire outer circumference of both an end of the exterior sheet in a length direction of the at least one electric wire and the connector.

3. The wire harness according to claim 1,
    wherein the exterior cover has a tubular shape that surrounds an outer circumference of the exterior sheet and includes a second waterproof cover that covers a gap between an inner peripheral surface of an end region of the exterior cover in a length direction of the at least one electric wire and the outer surface.

4. The wire harness according to claim 1,
    wherein the exterior cover has a tubular shape that surrounds an outer circumference of the exterior sheet and has a drain that passes through the exterior cover between an inside and an outside along a direction that intersects a length direction of the at least one electric wire.

5. The wire harness according to claim 1,
    wherein the exterior sheet includes the water repellant over an entire outer surface.

6. The wire harness according to claim 1,
    wherein the exterior sheet is woven fabric or nonwoven fabric.

7. The wire harness according to claim 1,
    wherein the exterior sheet is woven fabric in which resin fibers have been interwoven.

8. The wire harness according to claim 1, wherein:
the exterior sheet includes a plurality of mesh holes, and
the water repellant is a film that covers the mesh holes.

9. A wire harness comprising:
at least one electric wire;
a connector provided at an end of the at least one electric wire; and
an exterior sheet that surrounds an outer periphery of the at least one electric wire,
wherein the exterior sheet is wrapped around the outer periphery of the at least one electric wire and includes a water repellant, which has water repellency, on at least part of an outer surface of the exterior sheet, and
wherein the exterior sheet is an elastomer sheet.

10. A wire harness comprising:
at least one electric wire;
a connector provided at an end of the at least one electric wire; and
an exterior sheet that surrounds an outer periphery of the at least one electric wire, wherein:

the exterior sheet is wrapped around the outer periphery of the at least one electric wire and includes a water repellant, which has water repellency, on at least part of an outer surface of the exterior sheet, the connector includes a connector housing that internally holds end regions of the at least one electric wire in a length direction of the at least one electric wire and a shield shell that covers at least part of an outer surface of the connector housing, the wire harness further comprises a braid that covers an outer circumference of the at least one electric wire and contacts the shield shell, and the exterior sheet is wrapped around an outer circumference of the braid.

* * * * *